April 6, 1937.  A. W. LOERKE  2,075,817
WING VORTEX REDUCER
Filed Aug. 17, 1934  2 Sheets-Sheet 1
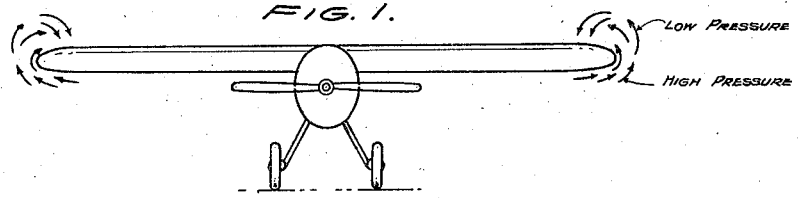
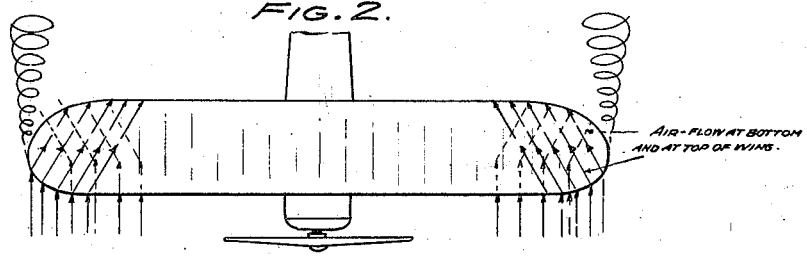
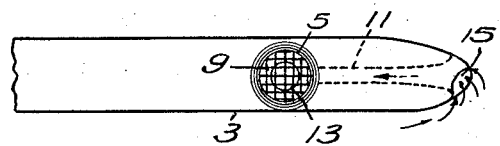 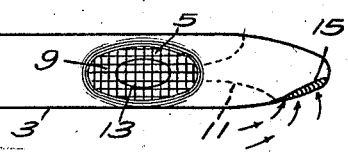
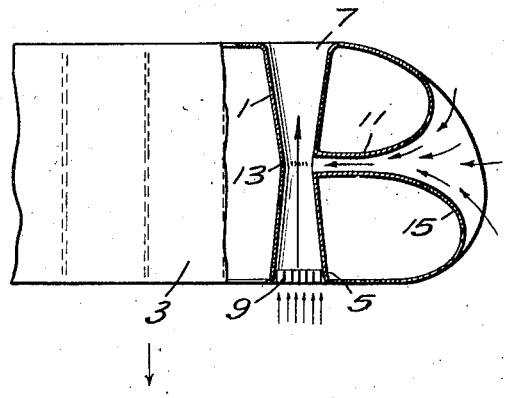 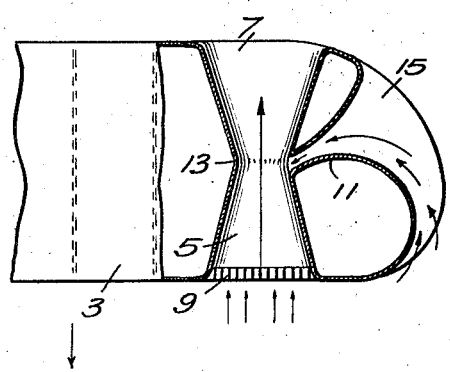
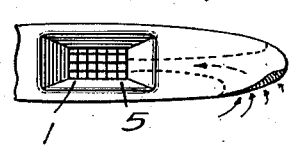 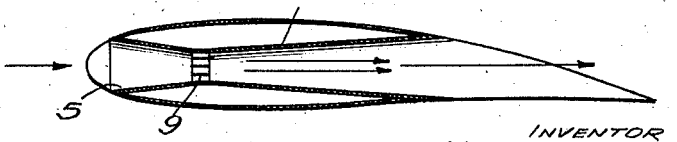
INVENTOR
ARTHUR W. LOERKE
BY
ATTORNEYS April 6, 1937.  A. W. LOERKE  2,075,817
WING VORTEX REDUCER
Filed Aug. 17, 1934  2 Sheets-Sheet 2
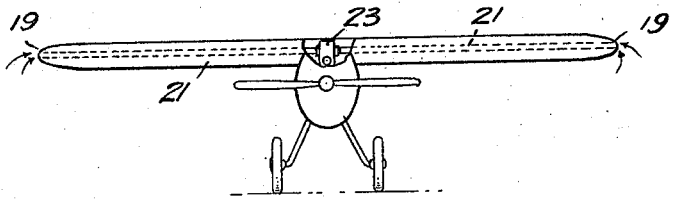
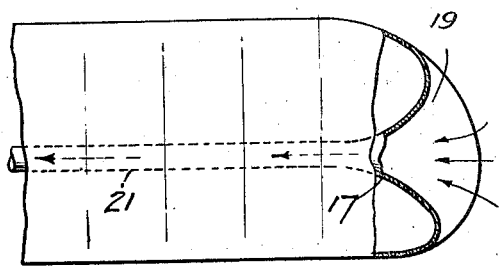
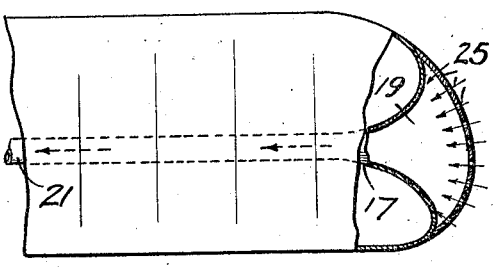
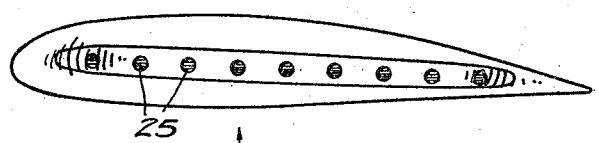
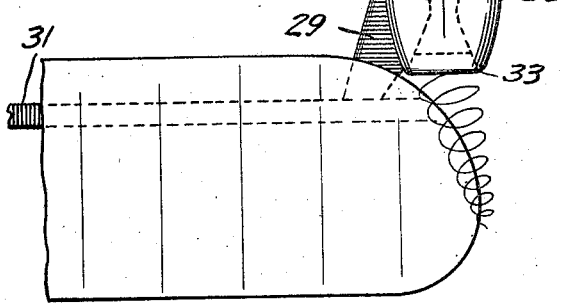
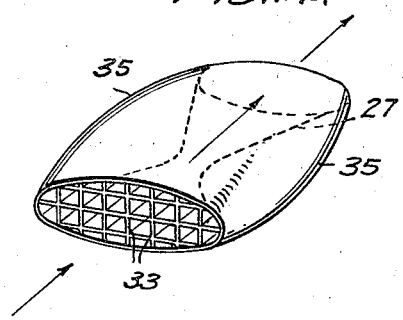
INVENTOR
ARTHUR W. LOERKE
BY
ATTORNEYS Patented Apr. 6, 1937

2,075,817

UNITED STATES PATENT OFFICE 2,075,817

WING VORTEX REDUCER

Arthur W. Loerke, Dayton, Ohio

Application August 17, 1934, Serial No. 740,280

13 Claims. (Cl. 244—130)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to airplane wings generally but more particularly to the concentration of load at the extreme tips of the wing resulting from the creation of turbulent air flow due to the presence of wing tip vortices.

In all types of airplane wings, a whirl or "vortex" is produced at the wing tips. This vortex is caused by the difference in pressure between the upper and lower surfaces of the wing; the air at the bottom surface of the wing having a higher pressure tends to move into the low pressure area on the top surface at the wing tip. This vortex adds considerable disturbance and drag to the airplane. Hence, if this vortex is reduced or eliminated the drag would be decreased and the speed of the airplane increased.

It is, therefore, a principal object of this invention to increase materially the aerodynamic efficiency of an airplane wing by reducing or eliminating disturbances and vortices at the wing tips.

In addition to the above, other objects of the invention are: (a) to make formation flying safer and to allow closer formations; (b) to reduce drag by straightening the airflow over the wing; and (c) to increase the speed of the airplane.

Briefly described, the invention consists in a method and means to eliminate or reduce the wing tip vortices by suction applied to the wing tips, or by the use of some form of airflow straightener at the source of the turbulent flow.

The advantages of the invention and its method of operation will be apparent from the following detailed description of specific embodiments thereof, when read in connection with the accompanying drawings, in which:

Figure 1 is a view of an airplane, in elevation, showing the direction of the airflow about the wing tips.

Figure 2 is a view of an airplane, in top plan, showing the direction of the airflow over the top and bottom surfaces of the wing tip.

Figure 3 is a front elevation of a wing portion including the tip and embodying, for the purposes of the invention, a Venturi tube assembly at and within the wing tip.

Figure 4 is a top plan view of the wing portion with the wing tip in horizontal section to more clearly disclose the Venturi tube assembly.

Figures 5 and 6 are views similar to the above but disclosing another form of the Venturi tube assembly.

Figures 7 and 8 are views, in elevation, and vertical cross section respectively, of an additional and different form of Venturi tube assembly.

Figure 9 is a front elevation of an airplane showing the manner of reducing or eliminating wing tip vortices by suction at the wing tip supplied by a mechanical pump.

Figures 10 and 11 are plan views, on an enlarged scale, of the different wing tip structures as designed to accomplish two purposes of the invention when the suction is supplied by a mechanical pump.

Figure 12 is an edge view of the wing tip shown in Figure 11.

Figure 13 is a view, in top plan, of a wing tip equipped, in a further variation of the invention, with a Venturi tube assembly arranged to straighten or smooth the airflow off the trailing edge of the wing tip.

Figure 14 is a detail view, in perspective, of the airflow straightener.

The airflow about an airplane wing is graphically illustrated in Figures 1 and 2; the solid lines of Figure 2 indicating direction of flow over the upper surface of the wing and the dotted lines indicating the flow under the wing. It is well known that when an airplane wing is moving through the air, there is an area of low pressure over the top of the wing and an area of high pressure under the wing. At each tip of the wing, therefore, the air under the wing flows up into the low pressure area on top, as represented in Figure 1, forming a whirl or "vortex" at the wing tip. These tip vortices originally are small and have a high rate of rotation but gradually enlarge, as shown in Figure 2, and the rate of rotation decreases until the whole disturbance dies out. This creation of turbulent flow always means an increase in drag and hydrodynamic theory shows that the work required to overcome the induced drag is equal to the energy absorbed by the wing tip vortices.

The present invention proposes to reduce or eliminate the wing tip vortices by means of suction at the wing tip, supplied by a Venturi tube or mechanical pump as shown in Figures 3 to 12 inclusive, or by the use of some form of air straightener such as shown in Figures 13 and 14.

In the Venturi tube assembly shown in Figures 3 to 8 inclusive, the Venturi tube I is installed in the wing tip 3 crosswise of the wing with its smaller or air inlet end 5 at the leading edge of the wing and its outlet end 7 at the trailing edge. Airflow straightening plates or vanes 9 are provided in the forward end of the venturi and a flat, bell mouth, side tube 11 leads outwardly from the narrowest part or throat 13 of the venturi to the tip of the wing with its bell mouth 15 opening outwardly and downwardly of the wing tip in the manner illustrated. The speed of the air passing through the venturi is very much greater in the throat than at the forward or the rear end, and also higher than the speed of the air outside. Consequently, the venturi produces a pressure lower than atmospheric pressure, or a suction, within the side tube 11. As a result, the air on the underside of the wing tip is drawn into the wing tip through the bell mouth of the side tube and thus prevented from flowing up into the low area on top. The formation of whirls or "vortices" at the tip of the wing is thus avoided and the discharge of the air from the rear end of the venturi ensures a smooth flow off the trailing edge of the wing tip. Various shapes of Venturi tubes may be so employed. For example, the venturi may be of circular cross section as in Figure 3, or elliptical as in Figure 5, or rectangular as in Figure 7.

In the pump type of installation, shown in Figures 9 to 12 inclusive, a bell mouth suction tube 17, similar to the Venturi side tube 11, is installed in like manner within the wing tip with its bell mouth 19 adjacent the edge of the wing tip. At its inner end, the tube 17 is either connected with, or prolonged to form, a pipe 21 extending longitudinally of the wing and connecting at its inner end with a suction pump 23, as shown in Figure 9. The suction tube 17 may have its bell mouth 19 opening directly through the wing tip to receive the airflow as in Figure 10, or the wing tip edge may be provided adjacent the bell mouth of the suction tube with a series of small air holes 25 through which the air passes into the bell mouth, as shown in Figures 11 and 12.

In the airflow straightener type of installation shown in Figures 13 and 14, a Venturi tube 27 is supported, by a bracket 29 attached to the rear spar 31 of the wing, at the tip of the wing and rearwardly of the trailing edge thereof in the direct path of the wing tip vortices so as to intercept the latter almost at their moment of conception. The whirls or vortices, are straightened out by their passage through the venturi and by the plates or vanes 33 in the intake end of the venturi. The creation of turbulent flow, with its induced drag, behind the wing tip is thus reduced to a minimum if not entirely eliminated and the aerodynamic efficiency of the wing is proportionately increased. The Venturi tube 27 may, if desired, be provided with a streamline cover 35.

It is to be understood that the invention is not restricted to the specific embodiments above herein described, and illustrated but that various other arrangements and combinations may be resorted to within the scope of the appended claims.

Having thus described the invention, what is claimed, as new, is:

1. In an airplane wing structure, the combination with a wing of a tube having a grill work of air straightener plates therein, said tube being located at the tip of the wing and rearwardly of the trailing edge thereof in the direct path of wing tip vortices to intercept and straighten same to provide for smooth flow of air off the tip trailing edge.

2. In an airplane wing structure, the combination with a wing of a Venturi tube at the tip of wing and rearwardly of the wing tip trailing edge with its suction end disposed close to the wing tip to intercept and guide into the tube almost at their conception the air whorls or vortices formed at the wing tip, and a grillwork of air straightener plates within the tube whereby said vortices are straightened out during passage through the tube.

3. In an airplane wing structure, in combination, a wing, a Venturi tube, a supporting connection between the tube and wing supporting the tube at the wing tip and rearwardly of the wing tip trailing edge to provide a suction passage into which the wing tip vortices pass, and a series of airflow straightening plates in the intake end of the tube.

4. In an airplane wing structure, the combination with a wing of a Venturi tube exteriorly thereof and rearwardly of the wing tip trailing edge in the direct path of wing tip vortices passing off the wing tip, a streamline cover encasing the said tube between its ends, and a grillwork of air straightening plates at one end of the tube.

5. A wing vortex reducer comprising, in an aircraft, a wing having a fore-and-aft passage for the flow of air through the wing from the leading to the trailing edges thereof and a lateral passage for the flow of air into the wing from the tip end thereof, said lateral passage communicating with the fore-and-aft passage.

6. A wing vortex reducer comprising, in an aircraft, a wing having a fore-and-aft passage for the flow of air through the wing from the leading to the trailing edges thereof and a lateral passage for the flow of air into the wing from the tip end thereof, said lateral passage communicating with the fore-and-aft passage, and a grillwork of air straighteners in said fore-and-aft passage.

7. A wing tip vortex reducer comprising, in an aircraft, the combination of a wing, a passage-defining member connected with the wing with its air-intake end disposed and arranged adjacent a tip of the wing so as continuously and fully to intercept and to guide into the member when the aircraft is in flight the air at the wing tip producing and tending to produce wing tip vortices and with its air-outlet end disposed and arranged to conduct and discharge the intercepted air into the airstream behind the wing and along a path substantially parallel to the direction of said airstream and a grillwork of air straightening plates in the passage of the said member.

8. A wing vortex reducer comprising, in an aircraft, a wing having a fore-and-aft passage for the flow of air through the wing from the leading to the trailing edges thereof and a lateral passage for the flow of air inwardly of the wing from the tip end thereof, the said fore-and-aft passage having a constriction therein and the said lateral passage communicating with the fore-and-aft passage at the point of maximum constriction of the latter.

9. A wing tip vortex reducer comprising in an aircraft, a wing having internal suction passages leading longitudinally inward thereof from openings in the edges of the wing tips, and air pump means for producing a low pressure area within the wing and common to the said suction passages establishing a pressure differential between wing tip openings and the inside of the wing resulting in a continuous flow of air into the wing tip to avoid wing tip vortex effect when the aircraft is in flight.

10. A wing tip vortex reducer comprising, in an aircraft, a wing having an air inlet passage at the tip, and a venturi suitably located on the aircraft within and with its axis parallel to the air stream of the aircraft and with its throat in communication with the air inlet passage of the wing whereby fluid flow through the venturi establishes a pressure differential between the tip end of the wing and the throat of the venturi such as to cause a continuous flow of air into the wing tip and through the venturi to avoid vortex effect at the wing tip.

11. A wing tip vortex reducer comprising, in an aircraft structure, a wing having its tip portions respectively provided with an air passage extending in a fore-and-aft direction through the wing in spaced inwardly relation to the wing tip edges and an air-intake passage between the fore-and-aft passage and the wing tip edge, said air intake passage being shaped to provide a bell mouth at its outer end which is disposed at and opens through the wing tip edge and a contracted portion at its inner end which has communication with the said fore-and-aft passage, and the said fore-and-aft passage being contracted at the point of communication with the air intake whereby the pressure of the air entering said passages is reduced at the contractions in said passages.

12. An airplane wing having a Venturi tube in the wing tip and extending fore-and-aft of the wing with its intake end at the leading edge of the wing and its outlet at the trailing edge, and a flat bell mouth side tube leading outwardly from the throat of the Venturi tube to the tip of the wing with its bell mouth facing downwardly and outwardly of the wing tip edge.

13. A wing tip vortex reducer comprising, in an aircraft, the combination of a wing, a tube supported by the wing and having an airflow passage consisting of flared intake and discharge conduits leading to and from respectively a contraction in the passage, the said intake conduits being disposed and arranged adjacent the wing tip so as continuously and fully to intercept and guide into the passage during the flight of the aircraft, the airflow at the wing tip producing or tending to produce wing tip vortices and the said discharge conduit being disposed and arranged to discharge the intercepted air in the direction of and substantially parallel to the normal airflow rearwards of the said wing and a grillwork of air straightening plates in said passage.

ARTHUR W. LOERKE.